April 10, 1962  J. P. BACON  3,028,752
ULTRASONIC TESTING APPARATUS
Filed June 2, 1959

INVENTOR.
JOHN P. BACON
BY
*Philip Mintz*
ATTORNEY

United States Patent Office 3,028,752
Patented Apr. 10, 1962

3,028,752
ULTRASONIC TESTING APPARATUS
John P. Bacon, Levittown, Pa., assignor to Curtiss-Wright Corporation, a corporation of Delaware
Filed June 2, 1959, Ser. No. 817,609
10 Claims. (Cl. 73—67.8)

This invention relates to nondestructive testing of materials. More specifically, this invention relates to a new and improved probe for nondestructively testing an object by means of acoustic waves.

Nondestructive testing methods and apparatus are receiving wider and wider acceptance in industry, particularly where the limits to which different materials are subjected become more and more critical. One of the most useful methods for the nondestructive testing of objects lies in the field of ultrasonics wherein acoustic waves above the audible range are utilized for testing objects for internal and surface discontinuity flaws.

The conventional procedure is to utilize an electromechanical transducer, generally in the form of a piezoelectric crystal, which generates the ultrasonic waves and transmits the same into the object under test. A receiving transducer is responsive to the acoustic waves that pass through the material or which are reflected from the discontinuity flaw to provide some indication of the presence of a flaw within the area of the ultrasonic beam. The receiving transducer may be either the same transducer as the generating transducer or a second different transducer.

Since ultrasonic waves are greatly attenuated by air, it is generally necessary to provide an effective contact between the transmitter and the object under test. In the technique of immersion testing, the transducer is coupled to a portion of the surface of the object under test by means of a liquid couplant. This liquid coupling may be achieved by immersing both the object to be tested and the electro-mechanical transducer in a liquid filled container.

In this immersion testing technique, a substantial portion of the beam of ultrasonic energy impinging on the front surface of the object being tested is reflected back to the transmitting and receiving crystal. From the crystal it is echoed back to the surface of the object being tested and re-echoed back to the crystal, forming multiple echoes through the liquid coupling path. In addition, the remainder of the original beam penetrates into the interior of the solid object under test. When this portion of the beam strikes a flaw, it is either scattered or reflected back through the object under test and then through the liquid couplant to the transmitting and receiving crystal.

Because there are many types of echoes occurring in such a system, both the echoes from discontinuities within the object under test and the back surface of the object under test, as well as from the front surface of the object under test, it sometimes becomes very difficult to interpret the results obtained. However, if a path through the liquid for the ultrasonic energy is provided such that the ultrasonic energy requires a longer time to pass through the liquid couplant than it does for its entire stay within the solid object under test, it is possible to have the second echo from the front surface of the object reach the receiver transducer a sufficiently long time after the first echo that all echoes from within the object are received during the time interval between receiving the first echo and receiving the second echo from the surface, whereby the echoes from the front surface of the object will not interfere with the interpretation of the echoes from within the object.

At present, experimentation is being conducted using focused ultrasonic beams for various purposes. Such focusing is currently being accomplished in either of two ways.

A first way is by use of a curved transducer, which produces directly a focused ultrasonic beam. This method has proven unsuccessful in practice largely due to the difficulty in reproducing in quantity transducers having identical focal characteristics and because of the great expense in precision grinding curved surfaces on transducer crystals.

A second method is to incorporate lenses in the beam of ultrasonic energy for focusing such beam by refraction. This method likewise has been unsuccessful due to losses of ultrasonic energy by reflection from the surfaces of such lenses, as well as due to the loss of ultrasonic energy during transmission through the forming or focusing lenses.

It is accordingly an object of the present invention to provide a new and improved ultrasonic testing apparatus which overcomes the disadvantages of the conventional testing arrangements.

It is a second object of the invention to provide an ultrasonic test probe for immersion testing wherein it is possible to have a long liquid couplant path even though the transducer crystal cannot be spaced far from the surface of the object being tested.

A further object of the invention is to provide an efficient means for focusing ultrasonic energy, which means is low in price and which produces reproducible results.

A still further object of the invention is to provide means for producing ultrasonic beams having special shapes.

With the above objects in view, the present invention mainly consists of an ultrasonic device including an electromechanical transducer for producing a beam of ultrasonic energy along a predetermined original beam path, and reflecting means having at least a curved portion positioned along said path to reflect said beam along a second path.

In a preferred mode of utilizing the present invention, the time required for the ultrasonic beam to cover the length of a liquid couplant path is greater than the time required for the ultrasonic beam to traverse its entire path within the solid object under test.

The novel features which are considered as characteristic for the invention are set forth in particular in the appended claims. The invention, itself, however, both as to its construction and its method of operation, together with additional objects and advantages thereof, will be best understood from the following description of specific embodiments when read in connnection with the accompanying drawings, in which:

Figure 1:
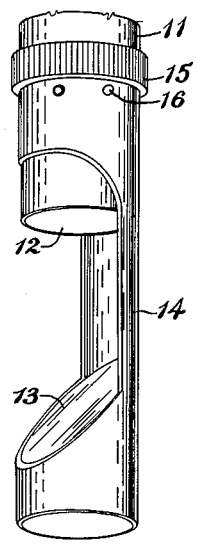
FIGURE 1 is a perspective view of an embodiment of the apparatus.
Figure 2:
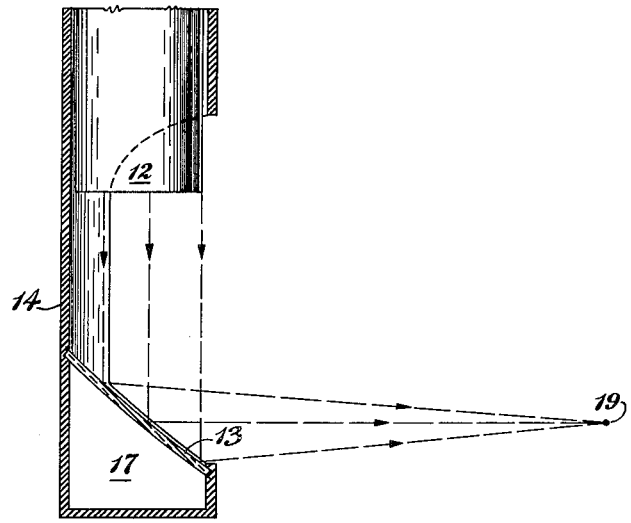
FIGURE 2 is a vertical sectional view of the apparatus illustrated in FIGURE 1.

Referring to the drawings, and more particularly to FIGURES 1 and 2, there is shown a search tube 11 having mounted thereon an electro-mechanical transducer 12 of conventional design. The search tube 11 is adapted to be connected by a cable (not shown) to an ultrasonic testing instrument having electrical generating means therein and having an indicator for displaying the results of the ultrasonic tests.

Electro-mechanical transducer 12 is adapted to produce a beam of ultrasonic energy which is directed downwardly as shown in FIGURE 1. Positioned within said beam of ultrasonic energy is a curved reflector member 13 mounted in housing 14 which is attached to search tube 11 by attaching means 15. Housing means 14 is also provided with vent holes 16 to allow air to escape from within the housing 14 when the probe unit is immersed in liquid.

As is more clearly illustrated in FIGURE 2, the surface of reflector 13 is substantially a section of a paraboloid of revolution whose axis is substantially parallel to the original beam path from transducer 12 toward reflector 13. For many purposes, however, the surface of reflector 13 may be a section of a sphere as a reasonable approximation to the above shape. In a preferred embodiment, reflector 13 is a thin piece of optically polished glass which is mounted in holder 14 so as to provide an air space 17 behind the reflector 13. This particular arrangement will tend to focus the beam of ultrasonic energy toward a point 19 outside the original beam path.

It will be noted that in this embodiment, as well as all of the other embodiments herein described, a distance for the ultrasonic beam to travel is provided between the transducer and the reflecting surface which is added to the distance from the reflecting surface to the surface of the object being tested. Thus, there is provided a ready means for having a long path for the ultrasonic energy through the liquid couplant medium without the necessity of having a large distance available perpendicular to the surface of the object being tested. As for example, when testing pipe from a position within the pipe, or inspecting objects such as gears from within the axial hole in the hub, it is possible, even though a relatively small hole is available, to have a relatively long liquid couplant path for the ultrasonic energy to traverse prior to entering into the solid object being tested while maintaining the beam of ultrasonic energy entering the object substantially perpendicular to the surface of the object.

In another embodiment, which may be considered as illustrated by FIGURE 2, reflecting surface 13 is substantially a section of a right parabolic cylinder whose axis is in a plane substantially perpendicular to the original beam path from transducer 12 toward reflector 13. This shape reflector would tend to focus the ultrasonic beam toward a line 19 perpendicular to the original beam path. For many purposes, however, the surface of reflector 13 may be a section of a right circular cylinder as a reasonable approximation to the above shape.

Figure 3:
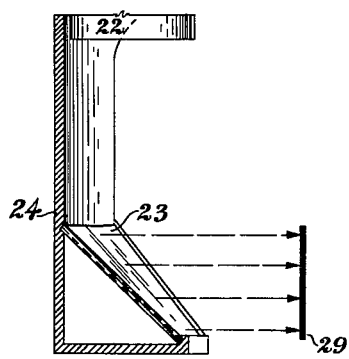
FIGURE 3 is a vertical sectional view of a second embodiment of the apparatus.

Referring now to FIGURE 3, the reflector 23 is positioned in the beam from transducer 22 by housing 24. The surface of reflector 23 is substantially a section of a right circular cone whose axis is substantially parallel to the original beam path and whose apex as illustrated is directed away from said transducer. This shape reflector will tend to focus the ultrasonic beam from transducer 22 toward a line 29 parallel to the original beam path.

Figure 4:
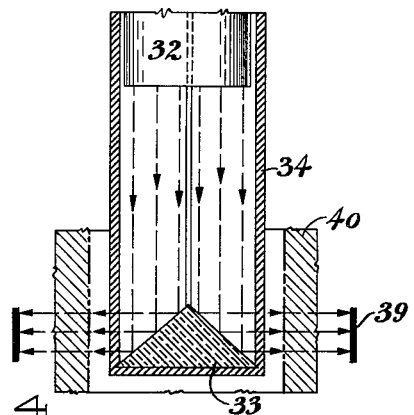
FIGURE 4 is a vertical sectional view of a third embodiment of the invention.

In the embodiment illustrated in FIGURE 4, conical reflector 33 is positioned by means of housing 34 within the beam emitted from electro-mechanical transducer 32. This configuration of reflector 33 deflects the beam of ultrasonic energy from transducer 32 into a radially expanding cylindrical band 39 as illustrated in FIGURE 4 so that substantially 360° coverage is obtained. Housing 34 is constructed so as to be very thin at least within the region where the ultrasonic beam is passing radially outward through the housing region. This is to minimize the loss of ultrasonic energy by interference with the housing. Of course, this portion of housing 34 may be preferably made of a material having a low acoustic impedance.

Numeral 40 in FIGURE 4 represents a sectional phantom view of a portion of a pipe or gear being tested from the center of a relatively small opening therein. It will be noted that a relatively long path (which may be made as long as may be desired) for ultrasonic energy is provided from transducer 32 to conical reflector 33 in addition to the radial path from the reflector 33 to the front surface of the object 40 being tested.

Figure 5:
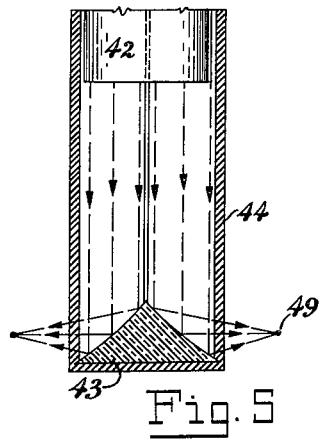
FIGURE 5 is a vertical sectional view of a fourth embodiment of the invention.

In still another embodiment of the invention as illustrated in FIGURE 5, reflector 43 is positioned by housing 44 in the beam from electro-mechanical transducer 42. The housing 44 is identical to housing 34 previously explained in connection with respect to FIGURE 4. The reflector 43 is substantially a section of a paraboloid generated by the revolution of a generating parabola about an axis parallel to the axis of the parabola. This gives a shape substantially as shown in FIGURE 5, which tends to focus the beam from transducer 42 toward a circle 49.

At present, transducers are generally available which will produce either beams having substantially circular cross-sections or beams having substantially rectangular cross-sections. With respect to the various reflector types herein described, either type of transducer may be used. However, it is preferred when focusing the beam toward a vertical or horizontal line, to use transducers which produce substantially rectangular beams. With respect to the other reflector types illustrated, it is at present preferred to use transducers which produce beams having a circular cross-section.

The electro-mechanical transducers herein referred to may be of any known type, such as piezoelectric crystals, magneto-strictive materials (such as ferrite), electrostrictive materials (such as barium titanate), etc., with or without special damping materials.

While the invention has been illustrated and described as embodied in a probe for acoustically testing the interiors of solid objects by immersion testing, it is not intended to be limited to the details shown since various modifications and structural changes and changes in use may be made without departing in any way from the spirit of the present invention.

Without further analysis, the foregoing will so fully reveal the gist of the present invention that others can by applying current knowledge readily adapt it for various applications without omitting features that fairly constitute essential characteristics of the generic or specific aspects of this invention, and, therefore, such adaptions should be and are intended to be comprehended within the meaning and range of equivalents of the following claims.

What is claimed as new and desired to be secured by Letters Patent is:

1. An ultrasonic angle beam deflector for nondestructively testing an object comprising in combination, a support member; an electromechanical transducer affixed to said support member for producing a beam of ultrasonic energy along a first beam path of a predetermined length in a liquid couplant; and reflecting means affixed to said support member and positioned from said transducer having at least a curved portion positioned along said first beam path for reflecting said beam along a second path in said liquid couplant and for causing said beam to impinge upon the surface of said object and be reflected from the surface of said object and defects therein, the lengths of said first and second beam paths being chosen so that the time interval required for that portion of the beam reflected by the defects within said object falls between the time intervals of the first and second echoes of that portion of the beam reflected back and forth along said first and second beam paths between the surface of said object and said transducer.

2. A device as defined in claim 1 wherein said curved portion is a section of a sphere.

3. A device as defined in claim 1 wherein said curved portion is a section of a cylinder.

4. A device as defined in claim 1 wherein said curved portion is substantially a section of a paraboloid of revolution whose axis is substantially parallel to the original beam path whereby said beam is reflected along said second path so as to be focused toward a point on said object.

5. A device as defined in claim 1 wherein said curved portion is substantially a section of a right circular cone whose axis is substantially parallel to the original beam path and whose apex is directed away from said transducer.

6. A device as defined in claim 1 wherein said curved portion is substantially a section of a paraboloid generated by rotation of the generating parabola about an axis parallel to the axis of the parabola whereby said beam focused along said second path is of a circular cross section.

7. A device as defined in claim 1 wherein said curved portion is a cone whose axis is substantially coaxial with the original beam path and whose apex is directed toward said transducer whereby said beam is reflected along said second path radially from the apex of said cone.

8. A device as defined in claim 1 wherein said means is positioned at such an angle to the original beam path as to reflect said beam substantially perpendicular to said original beam path.

9. A device as claimed in claim 1 wherein said means is polished glass.

10. A device as claimed in claim 8 wherein said means is polished glass.

References Cited in the file of this patent

UNITED STATES PATENTS

| | | |
|---|---|---|
| 2,005,741 | Hayes | June 25, 1935 |
| 2,459,162 | Hayes | Jan. 18, 1949 |
| 2,460,274 | Benioff | Feb. 1, 1949 |
| 2,467,301 | Firestone | Apr. 12, 1949 |
| 2,480,199 | Rosenberg et al. | Aug. 30, 1949 |
| 2,510,947 | Baker | June 13, 1950 |
| 2,592,135 | Firestone | Apr. 8, 1952 |
| 2,682,766 | Van Valkenburg | July 6, 1954 |
| 2,927,284 | Worrell et al. | Mar. 1, 1960 |